United States Patent [19]
Aotani

[11] Patent Number: 5,317,424
[45] Date of Patent: May 31, 1994

[54] DRUM TYPE IMAGE SCANNER
[75] Inventor: Toshiaki Aotani, Kyoto, Japan
[73] Assignee: Dainippon Screen Mfg. Co., Ltd., Kyoto, Japan
[21] Appl. No.: 802,094
[22] Filed: Dec. 4, 1991
[30] Foreign Application Priority Data
  Dec. 25, 1990 [JP] Japan ................................ 2-414464
[51] Int. Cl.$^5$ ............................................. H04N 1/04
[52] U.S. Cl. ................................ 358/491; 358/440; 358/406; 358/401
[58] Field of Search ............... 358/401, 406, 408, 474, 358/486, 490, 491, 493, 495, 496, 296, 489, 493, 497; 346/125, 132, 137, 138; H04N 1/04

[56] References Cited
U.S. PATENT DOCUMENTS 2,164,038  6/1939  McFarlane et al. ................. 346/138
4,870,504  9/1989  Ishida ................................... 358/489

Primary Examiner—Edward L. Coles, Sr.
Assistant Examiner—Jerome Grant
Attorney, Agent, or Firm—Lowe, Price, LeBlanc & Becker

[57] ABSTRACT

A drum type image scanner includes a transparent cylinder 2, and a cylinder drive motor 16, which are concentrically and rigidly fixed with a bracket 18. The bracket 18 is fixed to a base 12 by connecting a key way 24 of the bracket 18 and another key way 42 of the base 12 with a key 46. An optical unit 10 is movable along a track rail 34 on the base 12. When the cylinder unit 4 and the optical unit 10 are attached to the base 12, the track rail 34 runs parallel to the axis of the cylinder 2 owing to the connection of the key ways 24 and 42. The structure eliminates troublesome adjustment for parallelism between the axis of the cylinder 2 and the track rail 34 and the concentricity of the cylinder 2 with the cylinder drive motor 16, thus simplifying attachment of the cylinder 2 to the drum type image scanner 1.

13 Claims, 3 Drawing Sheets

DRUM TYPE IMAGE SCANNER

BACKGROUND OF THE INVENTION

1. Field of the Invention

The present invention relates to a drum type image scanner, and especially to a drum type image scanner having an optical unit movable along a straight track rail.

2. Description of the Related Art

A drum type image scanner generally includes a freely rotatable cylinder, or a drum, on which a sheet of an original is mounted. FIG. 1 is a schematic view illustrating a transparent cylinder 100 applied to a drum type image scanner.

The cylinder 100 is provided with a fixture disc 102 on one end thereof. The fixture disc 102 has a cylinder support shaft 104 projecting at its opposite side to the cylinder 100, and a tapered shaft 106 at the end of the support shaft 104. The cylinder 100 and the fixture disc 102 are integrally manufactured so that the axis of the cylinder 100 and those of the cylinder support shaft 104 and the tapered shaft 106 coincide with each other.

The tapered shaft 106 is inserted into a chuck 110 connected to a cylinder drive motor and fixed with a clamp ring 112 of the chuck 110. The cylinder 100 is thus rotatably held on the drum type image scanner.

The drum type image scanner further includes a straight track rail, a track table movable along the track rail, and an optical unit fixed on the track table. The optical unit includes a light source and an optical sensor.

The drum type image scanner functions in the following manner. An original held on the circumference of the cylinder 100 is irradiated with light emitted from the light source while the cylinder 100 is rotated and the optical unit is moving along the track rail in a direction parallel to the axis of the cylinder 100 (that is, in the subscanning direction). The photosensor receives light transmitted through or reflected from the original.

In such a conventional image scanner, however, the distance between the surface of the cylinder 100 and the photosensor is not always constant throughout scanning, which causes an out-of-focus or distorted image and poor resolution. The distance change is attributable to lack of parallelism of the axis of the cylinder 100 to the straight track rail, or to mismatch between the physical central axis of the cylinder 100 and its rotational axis. The distance change is seen as circumferential deviation of the cylinder 100.

The circumferential deviation of the cylinder 100 can be ascribed to mismatch between the central axis of the cylinder 100 and the rotational axis of the cylinder drive motor. The mismatch sometimes results from foreign matters such as dust between the tapered shaft 106 and the chuck 110.

Special care is thus required to check the outer face of the tapered shaft 106 and the inner face of the chuck 110 for foreign matters when the cylinder 100 is attached to the shaft of the cylinder drive motor. After the cylinder is attached, the circumferential deviation of the cylinder 100 is checked at regular intervals during test operation so as to ensure that the distance between the surface of the cylinder 100 and the photosensor is kept constant during scanning. When undesirable deviation of the cylinder 100 is detected, the cylinder 100 is reattached to the track rail and adjusted to make the circumferential deviation within an allowable range, thereby ensuring that the axis of the cylinder 100 is parallel to the track rail. These adjustments requires time, labor, and skills.

SUMMARY OF THE INVENTION

An object of the present invention is thus to simplify attachment of a cylinder in a drum type image scanner.

The present invention is directed to a drum type image scanner comprising: a cylinder on which an original to be scanned is mounted; a cylinder drive motor for rotating the cylinder; cylinder holding means for steadily holding the cylinder and the cylinder drive motor; optical means for optically reading the original on the cylinder; a base on which the optical means and the cylinder holding means are mounted. The base comprising: guide means for guiding the optical means along a straight track; and reference means for positioning the cylinder holding means to make the rotational axis of the cylinder parallel to the straight track of the guide means; and a driving motor for driving the optical means along the straight track.

According to an aspect of the present invention, the cylinder holding means comprises a bracket which has a bottom face formed parallel to the axis of the cylinder and a cylinder-key way, formed on the bottom face, parallel to the axis of the cylinder; the base further comprises a mount on which the bracket of the cylinder holding means is fixed, the mount being parallel to the straight track of the guide means and having a base-key way formed parallel to the straight track of the guide means, the base-key way being formed opposite to the cylinder key way; and the reference means comprises a key to be fitted into the base-key way and the cylinder-key wa to thereby steadily position the cylinder holding means on the base.

According to another aspect of the present invention, the cylinder holding means comprises a bracket which has a bottom face formed parallel to the axis of the cylinder, an end reference face formed perpendicular to the axis of the cylinder, and a side reference face formed parallel to the axis of the cylinder and perpendicular to the end reference plane; the base further comprises a mount on which the bracket of the cylinder holding means is fixed, the mount being parallel to the straight track of the guide means; and the reference means comprises a plurality of first reference pins projecting from the mount, and a second reference pin arranged a predetermined distance apart from a virtual straight line drawn through the first reference pins; wherein a vertical plane including the virtual line through the first reference pins is perpendicular to the straight track of the guide means, the second reference pin is in contact with the side reference face of the bracket, and the end reference face of the bracket is in contact with the first reference pins.

Preferably, the cylinder is transparent, and the optical means further comprises: a light source disposed inside the transparent cylinder; a pick-up lens disposed opposite to the light source across the transparent cylinder; and a photosensor for receiving light from the light source passing through the original on the transparent cylinder and the pick-up lens.

In the preferred embodiment, the optical means is disposed on the base in such a manner that the optical axis of the pick-up lens is placed at the same height as the axis of the cylinder. The base is preferably made of die-casting aluminum.

The present invention is also directed to a method of manufacturing a cylinder unit including a cylinder and a cylinder drive motor for rotating the cylinder each steadily fixed to each other, comprising the steps of: (a) preparing a cylinder, a cylinder drive motor, a fixture disc having a bottomed opening which is to be engaged with a shaft of the cylinder drive motor and which securely supports an end of the cylinder, and a bracket for securely supporting the cylinder drive motor; (b) fixing the cylinder drive motor to the bracket, fitting the fixture disc in the shaft of the cylinder drive motor, and fixing the bracket on a vertical plane to make the shaft of the cylinder drive motor upward; (c) inserting an end of the cylinder into the bottomed opening of the fixture disc, and filling a space between the cylinder and the fixture disc with an adhesive; (d) actuating the cylinder drive motor while the adhesive is setting, and detecting circumferential deviation of the cylinder during rotation; and (e) adjusting the orientation of the axis of the cylinder against the fixture disc to reduce the circumferential deviation less than a prescribed value, thereby aligning the center of the shaft of the cylinder drive motor with the axis of the cylinder.

According to an aspect of the present invention, the method of manufacturing a cylinder unit further comprising the step of: (f) continuing to actuate the cylinder drive motor until the adhesive completely sets after the center of the shaft of the cylinder drive motor is aligned with the axis of the cylinder. In the preferred embodiment, the step (a) comprises the step of preparing a plurality of first set screws of a through type which are disposed at a circumferential plane of the fixture disc and whose ends are to contact the circumferential plane of the cylinder, and a plurality of second set screws of a through type which are disposed at a side plane of the fixture disc and whose ends are to contact the circumferential plane of the cylinder; and the step (e) comprises the step of adjusting the orientation of the axis of the cylinder by driving at least part of the first and second set screws of a through type.

BRIEF DESCRIPTION OF THE DRAWINGS

The invention may be best understood by referring to the following description of the preferred embodiment and the accompanying drawings, wherein like numerals denote like elements and in which.

DESCRIPTION OF THE PREFERRED EMBODIMENT

Figure 1:
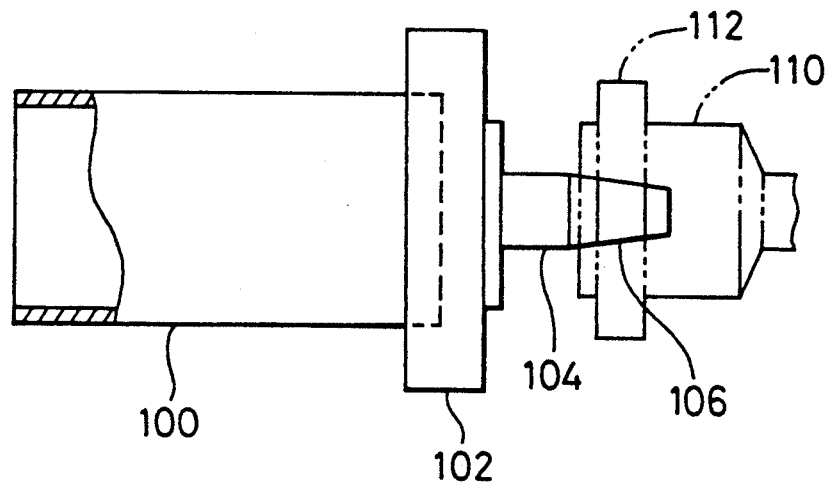
FIG. 1 is a schematic view illustrating a cylinder applied to a drum type image scanner.
Figure 3:
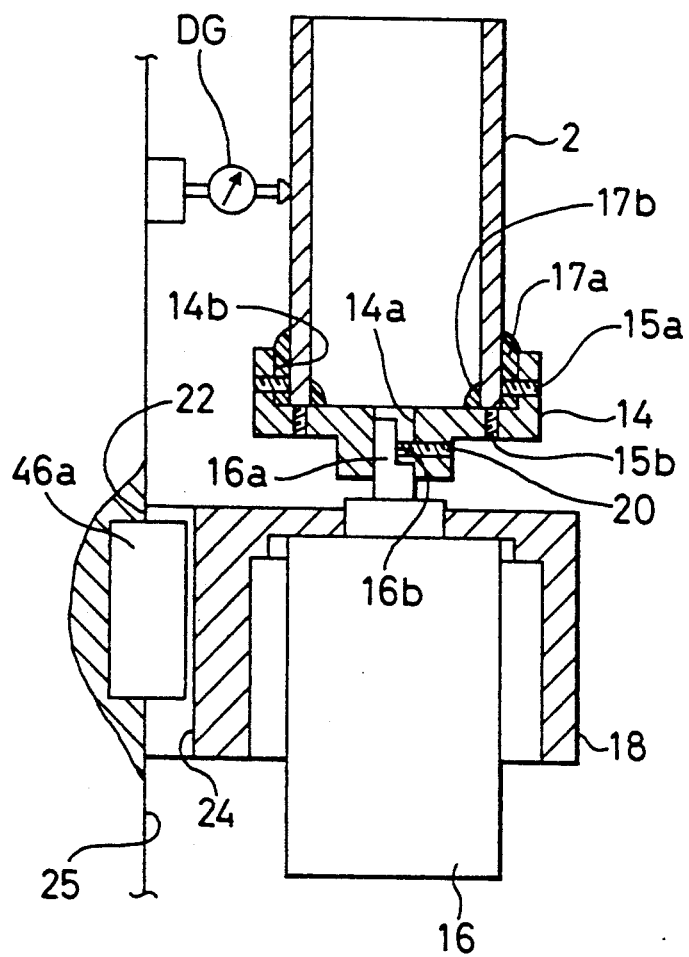
FIG. 3 is an explanatory view showing manufacturing process of a cylinder unit 4 in the drum type image scanner 1.
Figure 2:
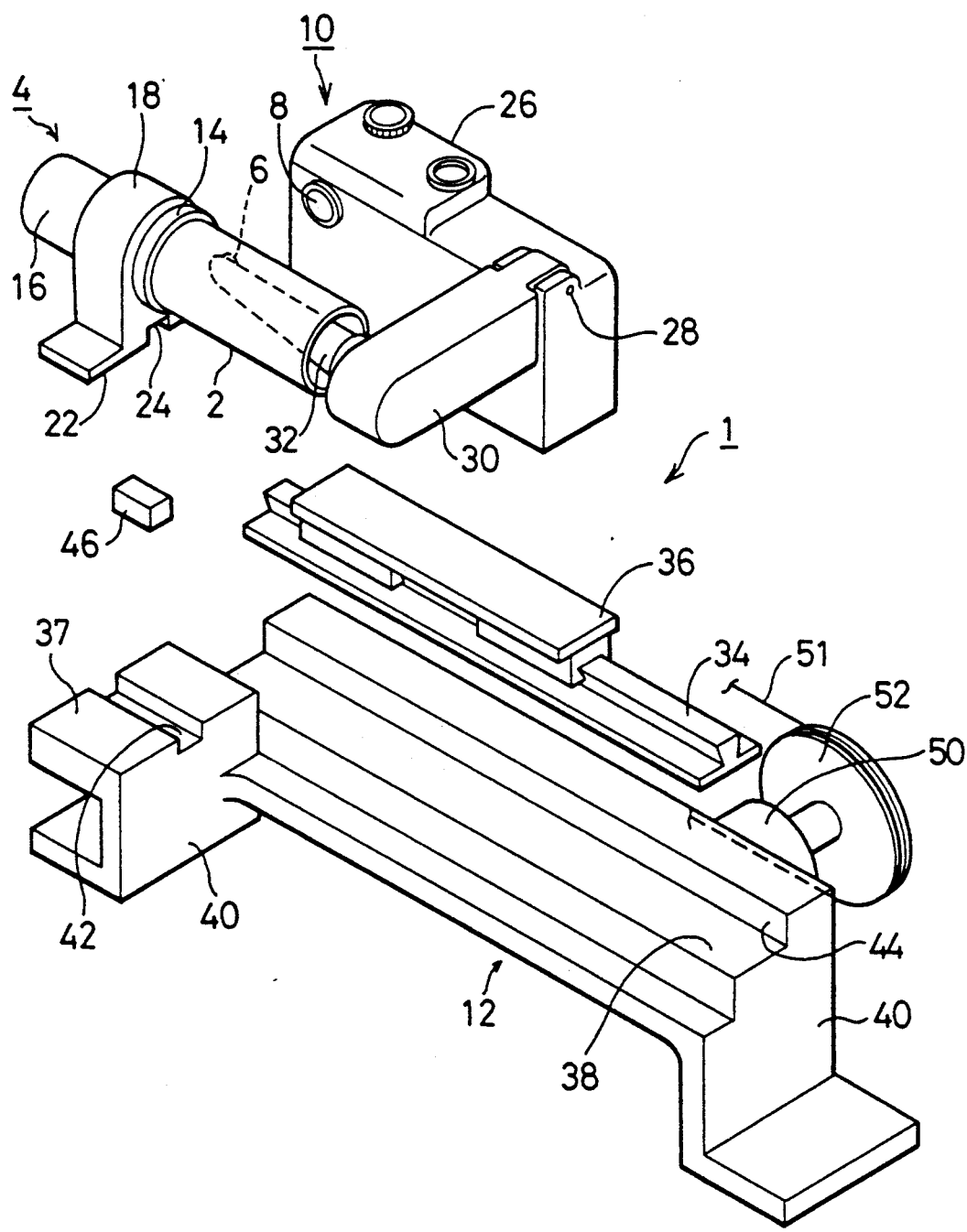
FIG. 2 is a decomposed perspective view illustrating a drum type image scanner 1 embodying the present invention.

FIG. 2 is a decomposed perspective view of a drum type image scanner 1 embodying the present invention. FIG. 3 is an explanatory view showing manufacturing process of a cylinder unit 4 in the drum type image scanner 1.

The drum type image scanner 1 comprises: the cylinder unit 4 rotatably holding a transparent cylinder 2 on which a sheet of an original is mounted; an optical unit 10 having a light source support pipe 32 and a casing 26 for an photosensor facing each other; and a base 12 to which the cylinder unit 4 and the optical unit 10 are attached. The cylinder unit 4 includes a fixture disc 14 having a bottomed opening for rigidly holding the cylinder 2 The fixture disc 14 is connected to a cylinder drive motor 16. The cylinder unit 4 further includes a bracket 18 fixed to one end of the motor 16.

A reference key way 24 is formed on a bottom face 22 of the bracket 18 in such a manner that the side walls of the key way 24 are perpendicular to the bottom face 22. The cylinder drive motor 16 is fixed to the bracket 18 so that a shaft 16a of the motor 16 is kept parallel to the bottom face 22 and to the side walls of the reference key way 24 as shown in FIG. 3. The center of the reference key way 24 is placed right below the center of the shaft 16a.

The cylinder 2 is horizontally disposed in service as shown in FIG. 2 but assembled in a vertical position as shown in FIG. 3.

The bottom face 22 of the bracket 18 is placed on a vertical reference plane 25 of a jig (not shown). A key 46a of the jig is inserted into the reference key way 24 to fix the bracket 18 to the jig, thereby the shaft 16a of the cylinder drive motor 16 is placed upward and parallel to the vertical reference plane 25.

The fixture disc 14 is connected with the cylinder drive motor 16 with the shaft 16a of the cylinder drive motor 16 inserted into a through hole 14a of the fixture disc 14, and a set screw 20 is tightened up so that the end of the set screw 20 is brought into contact with a milling plane 16b of the shaft 16a. The fixture disc 14 is thereby fixed to the cylinder drive motor 16.

The cylinder 2 is then set in a bottomed opening 14b of the fixture disc 14. The fixture disc 14 has, as shown in FIG. 3, six set screws of a through type 15a and 15b, which are arranged at equal spaces (60 degrees) on the side wall and the bottom face along the circumference of the cylinder 2. These set screws 15a and 15b are used for adjusting the axis of the cylinder 2.

A space between the outer face of the cylinder 2 and the inner face of the bottomed opening 14b is filled with adhesive 17a of gradually setting epoxy resin. Adhesive 17b of the same composition is also applied onto a joint between the inner face of the cylinder 2 and the inner face of the bottomed opening 14b.

The cylinder drive motor 16 is rotated at a low speed (several revolutions per minute) while the adhesives 17a and 17b are setting. The axis of the cylinder 2 is made coincident with the center of the shaft 16a of the motor 16 by adjusting the set screws 15a and 15b arranged on the side wall and the bottom of the fixture disc 14 before the adhesives 17a and 17b completely set. Adjustment of the set screws 15a and 15b is conducted on a temporary halt of the motor 16.

Adjustment process is described more concretely. A dial gauge DG is installed on the vertical reference plane 25 of the jig so that the end of the dial gauge DG is brought into contact with the outer face of the cylinder 2. Circumferential deviation of the cylinder 2 is measured with the dial gauge DG while the cylinder 2 is rotating. The set screws 15a and 15b of the fixture disc 14 are adjusted to make the needle of the dial gauge DG point an identical scale during one or more revolutions of the cylinder 2. Elimination of undesirable deviation of the cylinder 2 by means of the adjusted set screws 15a and 15b confirms that the axis of the cylinder 2 is parallel to the vertical reference plane 25 and is thereby coincident with the center of the shaft 16a of the cylinder-rotation motor 16.

Two dial gauges DG can be installed preferably near at both the upper and lower ends of the vertical cylinder 2.

After coincidence of the axis of the cylinder 2 with the center of the shaft 16a of the motor 16 is ensured, revolution of the cylinder drive motor 16 is continued at the low speed until the adhesives 17a and 17b fully set. The relative positions of the cylinder 2 and the shaft 16a of the motor 16 are unchanged after complete setting of the adhesives 17a and 17b.

The cylinder 2 and the cylinder drive motor 16 are thus connected to each other concentrically via the bracket 18, whereby the cylinder unit 4 including the cylinder 2, the motor 16, and the bracket 18 is completed.

The center of the reference key way 24 formed on the bottom face 22 of the bracket 18 is, as mentioned above, disposed immediately below the center of the shaft 16a of the motor 16 and thereby below the axis of the cylinder 2.

The optical unit 10 includes: a pick-up lens 8; the casing 26 having a photosensor (not shown) arranged on the optical axis of the pick-up lens 8; an arm 30 pivotably mounted to the casing 26 via a pivot 28; and the light source pipe 32 which is fixed to the arm 30 and has a luminous flux nozzle 6 on the tip thereof. A light source (not shown) is arranged adjacent to the luminous flux nozzle 6 in the light source pipe 32. When the light source pipe 32 is inserted into the cylinder 2, the luminous flux nozzle 6 is placed opposite to the pick up lens 8. The arm 30 pivotably moves around the pivot 28 from the position of FIG. 2 at which the luminous flux nozzle 6 faces the pick-up lens 8 to the upward perpendicular position.

The optical unit 10 is mounted on a track table 36 movable along a straight track rail or guide unit 34.

The base 12 includes: a seat 37 for supporting the cylinder unit 4; another seat 38 for supporting the optical unit 10, which has the top plane in parallel to that of the seat 37; a stepping motor 50 with a pulley 52 for driving the optical unit 10; a transmission wire 51, connected with the optical unit 10 to drive the same, running on the driving pulley 52 and an another pulley of the other side of the base; and legs 40. A reference key way 42, formed near the center of the seat 37, has a side wall perpendicular to the top plane of the seat 37 and the same width of key way as the reference key way 24 of the bracket 18. A side reference plane 44 perpendicular to the seat 38 is formed a predetermined distance apart from the center of the reference key way 42.

The reference key way 42 is part of the reference unit for positioning the cylinder unit 4. The seat 38 for the optical unit 10 is formed lower than the seat 37 for the cylinder unit 4 by a predetermined height so that the optical axis of the pick-up lens 8 is positioned at the same height as the axis of the cylinder 2 when the cylinder unit 4 and the optical unit 10 are attached to the base 12.

The cylinder unit 4 and the optical unit 10 are mounted on the base 12 in the following manner.

First, the cylinder unit 4 is fixed to the seat 37 of the base 12 with bolts (not shown). Meanwhile a key 46 is inserted between the reference key way 24 of the bracket 18 and the reference key way 42 of the seat 37 as shown in FIG. 2. On attachment of the cylinder unit 4, the bottom face 22 of the bracket 18 is brought into contact with the upper face of the seat 37 and the side walls of the reference key ways 24 and 42 are unitedly joined with each other across the key 46. Accordingly, the axis of the cylinder 2 is disposed parallel to the upper faces of the cylinder unit seat 37 and the optical unit seat 38 and apart from the side reference plane 44 at a predetermined distance.

The base 12 is made of die casting aluminum, and the seats 37 and 38, the reference key way 42, and the side reference plane 44 are finished with a milling cutter.

The track rail 34 securely supporting the optical unit 10 is then fixed to the seat 38 of the base 12 with bolts (not shown). Here, a side face of the track rail 34 contacts the side reference plane 44, which is cut to be parallel to the reference key way 42 and perpendicular to the optical unit seat 38. The optical unit 10 is driven by a driving system including the stepping motor 50, the transmission wire 51, and the pulleys to move along the straight track rail 34 on the upper face of the base 12. Because the reference key ways 24 and 42 are unitedly connected to each other via the key 46, the distance between the center of each key way 24 or 42 and the side reference plane 44 is unchanged. Accordingly, the track rail 34 for the optical unit 10 runs precisely parallel to the axis of the cylinder 2. Assembly of the main portion of the drum type image scanner 1 of the embodiment is thus completed.

In the drum type image scanner 1, the optical unit 10 moves in the subscanning direction while the rotation of the cylinder 2 is controlled at a predetermined speed. The original on the cylinder 2 is scanned with light emitted from the luminous flux nozzle 6 in the course of travel of the optical unit 10. Light passing through the original is incident on the pick-up lens 8 and is received by the photosensor. Finally, image signals representing the original is produced by the photosensor.

In the drum type image scanner 1, the cylinder 2 and the cylinder drive motor 16 are concentrically connected to and fixed to each other prior to being brought in service. The cylinder unit 4 integrally holding the cylinder 2 and the motor 16 is fixed to the base 12 by connecting the reference key way 24 of the bracket 18 to the reference key way 42 of the base 12 via the key 46. The axis of the cylinder 2 is accordingly kept parallel to the track rail 34 or the traveling direction of the optical unit 10. The structure of the embodiment does not require any troublesome adjustment for parallelism between the axis of the cylinder 2 and the track rail 34 or the concentricity of the cylinder 2 with the cylinder drive motor 16 on and after attachment, thus simplifying attachment of the cylinder 2 to the drum type image scanner 1.

When the cylinder 2 is flawed or cracked, the whole cylinder unit 4 including the damaged cylinder 2 is replaced with a new one. The new cylinder unit 4 integrally and concentrically holding the cylinder 2 and the cylinder drive motor 16 as well as the fixture disc 14 and the bracket 18 is positioned and mounted on the base 12 in the same manner as described above, so that the axis of the cylinder 2 is set parallel to the track rail 34.

The cylinder unit 4 can be assembled by manufacturers and supplied to users as an integral part. Users of the scanner can thus attach the cylinder unit 4 to the base 12 without any difficulty.

Further, the relative positions of the cylinder unit 4 and the optical unit 10 are easily adjusted because they are mounted on the same base 12.

The embodiment above is not intended to limit the invention to the embodiment, but there are many modifications and changes without departing from the scope of the invention as follows.

Figure 4:
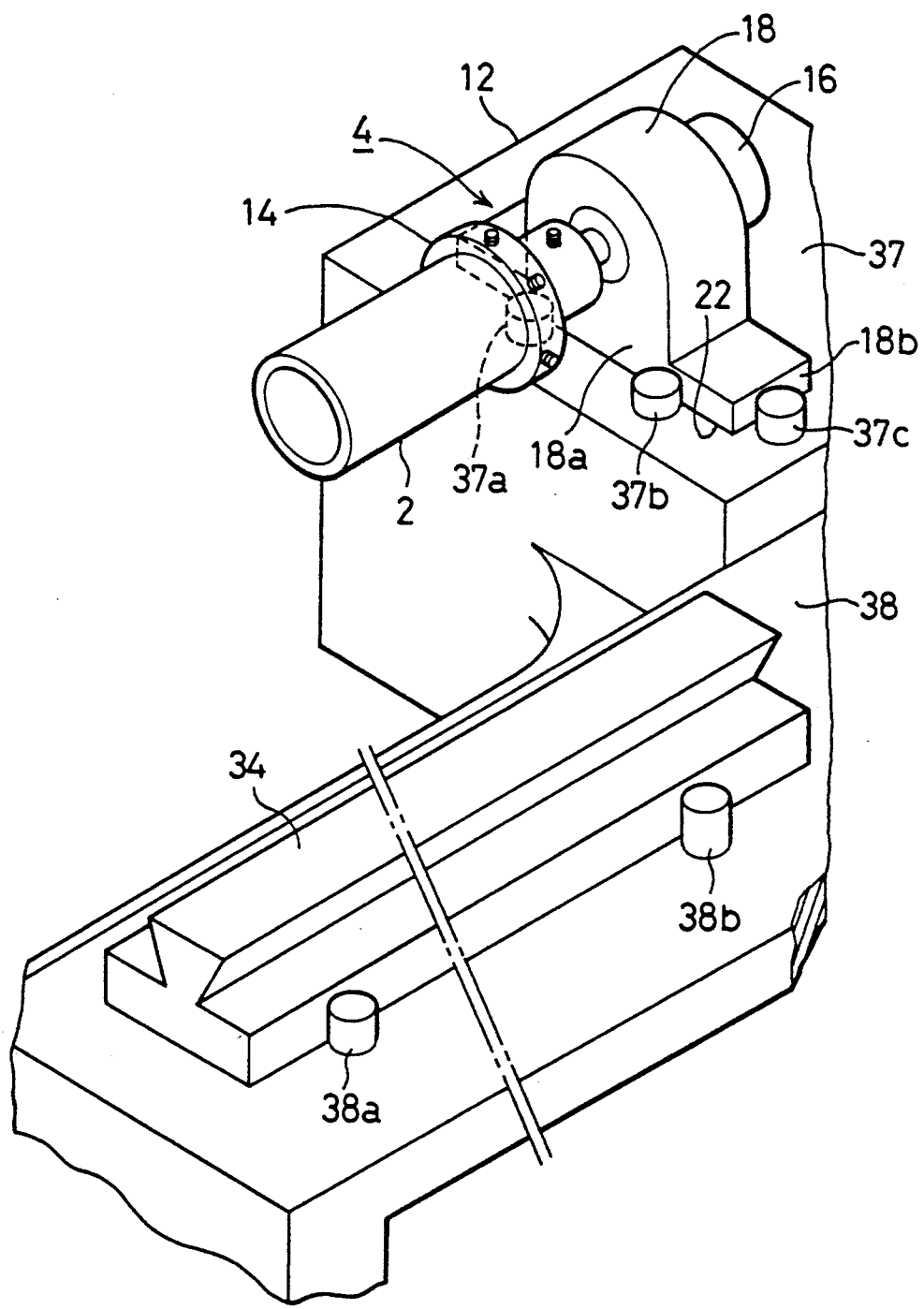
FIG. 4 is an explanatory view showing modification of the drum type image scanner according to the present invention.

FIG. 4 illustrates part of a modified drum type scanner. The bracket 18 of this scanner has: a front reference plane 18a facing the cylinder 2; and a side reference plane 18b facing the track rail 34 instead of the reference key way 24. The front reference plane 18a is formed in such a manner that extension of the reference plane 18a is normal to the axis of the cylinder 2, and the side reference plane 18b is formed such that extension of the reference plane 18b is parallel to the axis of the cylinder 2 and perpendicular to the front reference plane 18a.

The base 12 securely supporting the bracket 18 includes: two cylinder-reference pins 37a and 37b projecting from the top face of the cylinder unit seat 37; and another cylinder-reference pin 37c arranged some distance apart from a virtual straight line drawn through the two pins 37a and 37b on the seat 37. The optical unit seat 38 has two rail-reference pins 38a and 38b, in place of the side reference plane 44, to be in contact with the side face of the rail 34. The straight line between the two rail-reference pins 38a and 38b is normal to a vertical plane including the straight line through the two cylinder-reference pins 37a and 37b.

The bracket 18 is positioned and fixed to the cylinder unit seat 37 in such a manner that the front reference plane 18a is brought into contact with the side faces of the cylinder-reference pins 37a and 37b and the side reference plane 18b into contact with the side face of the cylinder-reference pin 37c. The track rail 34 is positioned and fixed to the optical unit seat 38 so that the side face of the rail 34 is brought into contact with the side faces of the rail-reference pins 38a and 38b.

In the above modification, the axis of the cylinder 2 can be arranged in the same manner as the first embodiment by simply fixing the cylinder unit 4 to the base 12 on which the track rail 34 is mounted. This modification does not require any labor-consuming adjustment to keep the axis of the cylinder 2 parallel to the track rail 34 or the traveling direction of the optical unit 10, thus simplifying attachment of the cylinder 2 to the drum type image scanner 1.

The reference unit can include two reference pins and fitting apertures in place of the key way and the key. This structure also allows the cylinder unit to be fixed to the base in such a manner that the axis of the cylinder is parallel to the straight track of the guide unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A drum type image scanner, comprising:
   a cylinder on which an original to be scanned is mounted;
   a cylinder drive motor for rotating said cylinder;
   cylinder holding means for steadily holding said cylinder and said cylinder drive motor;
   optical means for optically reading the original on said cylinder;
   a base on which said optical means and said cylinder holding means are mounted, comprising guide means for guiding said optical means along a straight track and reference means for positioning said cylinder holding means to make the rotational axis of said cylinder parallel to said straight track of said guide means; and
   a driving motor for driving said optical means along said straight track,
   wherein said cylinder holding means comprises a bracket which has a bottom face formed parallel to the axis of said cylinder and a cylinder-key way, formed on the bottom face, parallel to the axis of said cylinder,
   said base further comprises a mount on which said bracket of said cylinder holding means is fixed, said mount being parallel to the straight track of said guide means and having a base-key way formed parallel to the straight track of said guide means, said base-key way being formed opposite to said cylinder key way, and
   said reference means comprises a key to be fitted into said base-key way and said cylinder-key way to thereby steadily position said cylinder holding means on said base.

2. A drum type image scanner in accordance with claim 1, wherein:
   said cylinder is transparent, and said optical means further comprises: a light source disposed inside said transparent cylinder; a pick-up lens disposed opposite to said light source across said transparent cylinder; and a photosensor for receiving light from said light source passing through the original on said transparent cylinder and said pick-up lens.

3. A drum type image scanner in accordance with claim 2, wherein:
   said optical means is disposed on said base in such a manner that the optical axis of said pick-up lens is placed at the same height as the axis of said cylinder.

4. A drum type image scanner in accordance with claim 3, wherein said base is made of die-casting aluminum.

5. A drum type image scanner, comprising:
   a cylinder on which an original to be scanned is mounted;
   a cylinder drive motor for rotating said cylinder;
   cylinder holding means for steadily holding said cylinder and said cylinder drive motor;
   optical means for optically reading the original on said cylinder;
   a base on which said optical means and said cylinder holding means are mounted, comprising guide means for guiding said optical means along a straight track and reference means for positioning said cylinder holding means to make the rotational axis of said cylinder parallel to said straight track of said guide means; and
   a driving motor for driving said optical means along said straight track,
   wherein said cylinder holding means comprises a bracket which has a bottom face formed parallel to the axis of said cylinder, an end reference face formed perpendicular to the axis of said cylinder, and a side reference face formed parallel to the axis of said cylinder and perpendicular to said end reference plane,
   said base further comprises a mount on which said bracket of said cylinder holding means is fixed, said mount being parallel to the straight track of said guide means, and said reference means comprises a plurality of first reference pins projecting from said mount, and a second reference pin arranged a predetermined distance apart from a virtual straight line drawn through said first reference pins, wherein a vertical plane including the virtual line through said first reference pins is perpendicular to the straight track of said guide means, said second reference pin is in contact with the side reference face of said bracket, and said end reference face of said bracket is in contact with said first reference pins.

6. A drum type image scanner in accordance with claim 5, wherein:
said cylinder is transparent, and said optical means further comprises: a light source disposed inside said transparent cylinder; a pick-up lens disposed opposite to said light source across said transparent cylinder; and a photosensor for receiving light from said light source passing through the original on said transparent cylinder and said pick-up lens.

7. A drum type image scanner in accordance with claim 6, wherein:
said optical means is disposed on said base in such a manner that the optical axis of said pick-up lens is placed at the same height as the axis of said cylinder.

8. A drum type image scanner in accordance with claim 7, wherein said base is made of die-casting aluminum.

9. A method of manufacturing a cylinder unit including a cylinder and a cylinder drive motor for rotating the cylinder each steadily fixed to each other, comprising the steps of:
(a) preparing a cylinder, a cylinder drive motor, a fixture disc having a bottomed opening which is to be engaged with a shaft of said cylinder drive motor and which securely supports an end of said cylinder, and a bracket for securely supporting said cylinder drive motor;
(b) fixing said cylinder drive motor to said bracket, fitting said fixture disc in the shaft of said cylinder drive motor, and fixing said bracket on a vertical plane to make the shaft of said cylinder drive motor upward;
(c) inserting an end of said cylinder into the bottomed opening of said fixture disc, and filling a space between said cylinder and said fixture disc with an adhesive;
(d) actuating said cylinder drive motor while the adhesive is setting, and detecting circumferential deviation of said cylinder during rotation; and
(e) adjusting the orientation of the axis of said cylinder against said fixture disc to reduce the circumferential deviation less than a prescribed value, thereby aligning the center of the shaft of said cylinder drive motor with the axis of said cylinder.

10. A method of manufacturing a cylinder unit in accordance with claim 9, further comprising the step of:
(f) continuing to actuate said cylinder drive motor until said adhesive completely sets after the center of the shaft of said cylinder drive motor is aligned with the axis of said cylinder.

11. A method of manufacturing a cylinder unit in accordance with claim 10, wherein:
said step (a) comprises the step of preparing a plurality of first set screws of a through type which are disposed at a circumferential plane of said fixture disc and whose ends are to contact the circumferential plane of said cylinder, and a plurality of second set screws of a through type which are disposed at a side plane of said fixture disc and whose ends are to contact the circumferential plane of said cylinder; and
said step (e) comprises the step of adjusting said orientation of the axis of said cylinder by driving at least part of said first and second set screws of a through type.

12. A drum type image scanner for optically reading an original mounted on a cylinder with a movable optical means, comprising:
a cylinder drive motor for rotating said cylinder;
a holding means for holding said cylinder and said cylinder drive motor;
a linear rail for guiding a movement of said optical means;
a driving motor for driving said optical means along said linear rail; and
a base for supporting said holding means and said linear rail, said base having a first top surface, a first reference surface formed perpendicular to first top surface, a second top surface formed parallel to said first top surface, and a second reference surface formed perpendicular to said second top surface and parallel to said first reference surface,
wherein said holding means is disposed on said first top surface in a selected reference with respect to said first reference surface, and
said linear rail is disposed on said second top surface in a selected reference with respect to said second reference surface.

13. A drum type scanner according to claim 12, wherein:
said base is made of die-cast aluminum, and
said first and second top surface and first and second reference surfaces are each finished with a milling cutter.

* * * * *